W. HENSCHEN.
Bee Hive.
No. 47,169. Patented April 4, 1865.
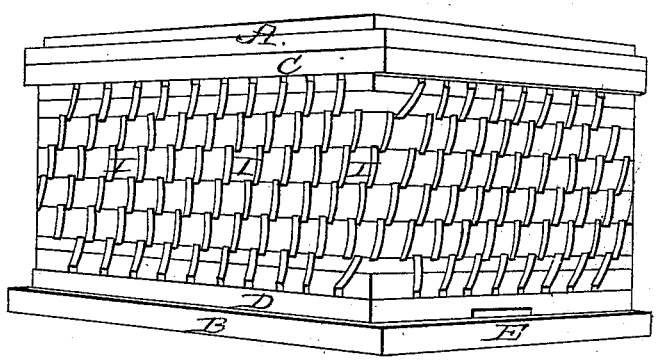
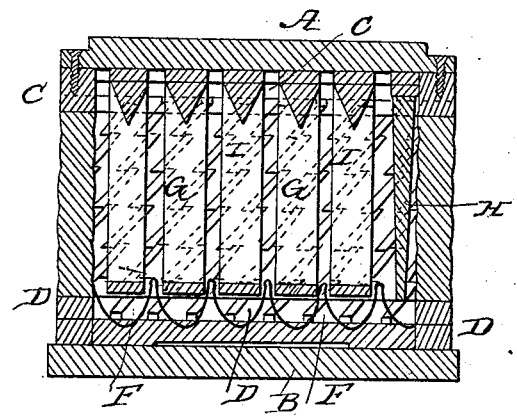
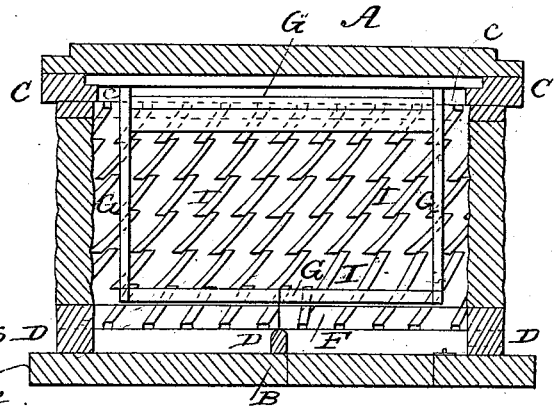

UNITED STATES PATENT OFFICE.

WILLIAM HENSCHEN, OF HENNEPIN COUNTY, MINNESOTA.

IMPROVEMENT IN BEE-HIVES.

Specification forming part of Letters Patent No. 47,165, dated April 4, 1865.

*To all whom it may concern:*

Be it known that I, WILLIAM HENSCHEN, of the county of Hennepin and State of Minnesota, have invented a new and Improved Method of Constructing Bee-Hives, of which the following is a specification.

The improvement consists in constructing the hive with straw or other similar material in continuous rolls or layers, and woven together with splints or other material, of a quadrangular form, with a frame at top and bottom, so as easily to admit of adjusting frames, boxes, &c., to it, thus combining in the same hive all the advantages of the common straw hive with the square form of the wooden box hive.

To be clearly understood, I annex the following explanation: A is the top, B the bottom, of the hive; C, the top frame, to which the splints are attached; D, the bottom frame; E, entrance for the bees; F, piece to keep the frames to their place; G, the frames; H, the cut-off to keep the bees from building their combs across the frames, and I the splints.

What I claim as new, and desire to secure by Letters Patent, is—

The arrangement, in the construction of a straw bee-hive, of a straw rope or layer of straw, with the splints I, top frame, C, and bottom frame, D, substantially as and for the purposes herein described.

WM. HENSCHEN.

Witnesses:
  W. W. ELLISON,
  SARAH R. ELLISON.